July 29, 1941.  C. W. LANPHERE  2,251,257

AUTOMATIC PNEUMATIC TRANSMISSION

Filed May 6, 1939   3 Sheets-Sheet 3

INVENTOR.
Elliott Lanphere.

Patented July 29, 1941

2,251,257

UNITED STATES PATENT OFFICE 2,251,257

AUTOMATIC PNEUMATIC TRANSMISSION

Clive W. Lanphere, Ridgewood, N. J.

Application May 6, 1939, Serial No. 272,217

22 Claims. (Cl. 74—336.5)

The present invention relates to a motor car transmission comprising both manual and automatic means for shifting gears or changing speeds. It is a modification of an earlier invention disclosed in my copending application, Serial No. 178,359, filed December 6, 1937.

One object of my invention is to provide means for shifting gears in the conventional manner.

Another object of my invention is to provide means for automatically actuating shifting mechanism by means of a speed control actuable in accordance with the speed of a car.

A further object of my invention is to provide pneumatic means actuable by said speed control and cooperating means for actuating transmission clutch members that are adapted to cooperate with gear members for changing car speeds.

A still further object of my invention is to provide automatic means for delaying and preventing actuation of some of the pneumatic means when the car is on a grade.

One feature of my invention is to provide control means for the shift actuating mechanism for preventing actuation of a plurality of shifts simultaneously by the speed control.

Another feature of my invention is to provide pneumatic valves releasable by the speed control and coacting means.

A further feature of my invention is to provide pneumatic valves releasable by some of the pneumatic and cooperating means.

A still further feature of my invention is to provide pneumatic cylinders for actuating these valves in one direction and springs for actuating them in the opposite direction.

The above and other features will be more fully understood by reference to the drawings in which:

Figure 1a is a diagrammatic view disclosing the continuation of these elements from line AA. It also discloses fluid or pneumatic actuating means some parts of which are shown in cross section, and a speed control also termed centrifugal means shown in part in cross section.

Figure 2 is a diagrammatic cross section of the transmission as seen from the rear showing some of the elements.

Figure 3 is a diagrammatic cross section of a pneumatic optical indicator adapted to show the specific functioning or neutral position of the gears. This indicator serves a useful purpose but can be eliminated by not providing means for connecting it with the speed changing pneumatic means as it is not essential to the operation of the device.

Figure 4 is a diagrammatic view of a side wall of the indicator case.

Figure 5 is a diagrammatic view of pneumatic means for actuating a clutch and gas valve simultaneously.

Figure 6 is a cross section of a speed control also termed a governor.

Figure 7 is a cross section view of an overrunning clutch or free wheeling unit taken on line 7—7 of Figure 1a.

Figure 8 is a diagrammatic end view of a plunger and a pivoted member thereon.

Figure 9 is a diagrammatic cross section view of a valve.

Figure 10 is a diagrammatic view of link connecting means for a plunger and valve releasing pawl.

Figure 1:
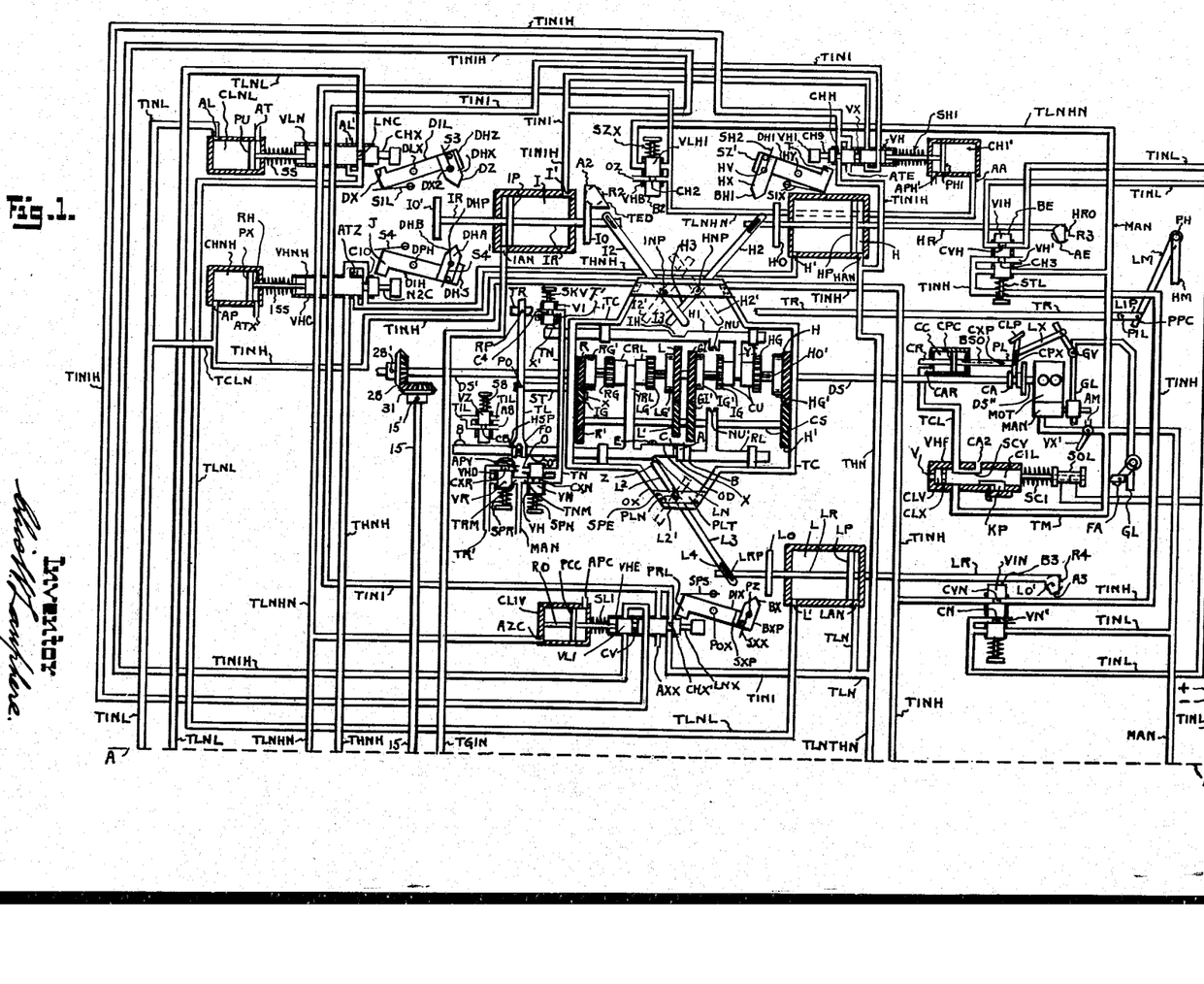
Figure 1 is a diagrammatic view of the transmission as seen from above and from the right side with some of the elements shown in cross section. It discloses the conventional speed changing means with some modifications and additions for actuating this means. The main and counter shafts are shown in the same plane to better disclose the cooperation of the elements. The transmission is shown in neutral position. Some of the elements are shown broken off on line AA.
Figure 1A:
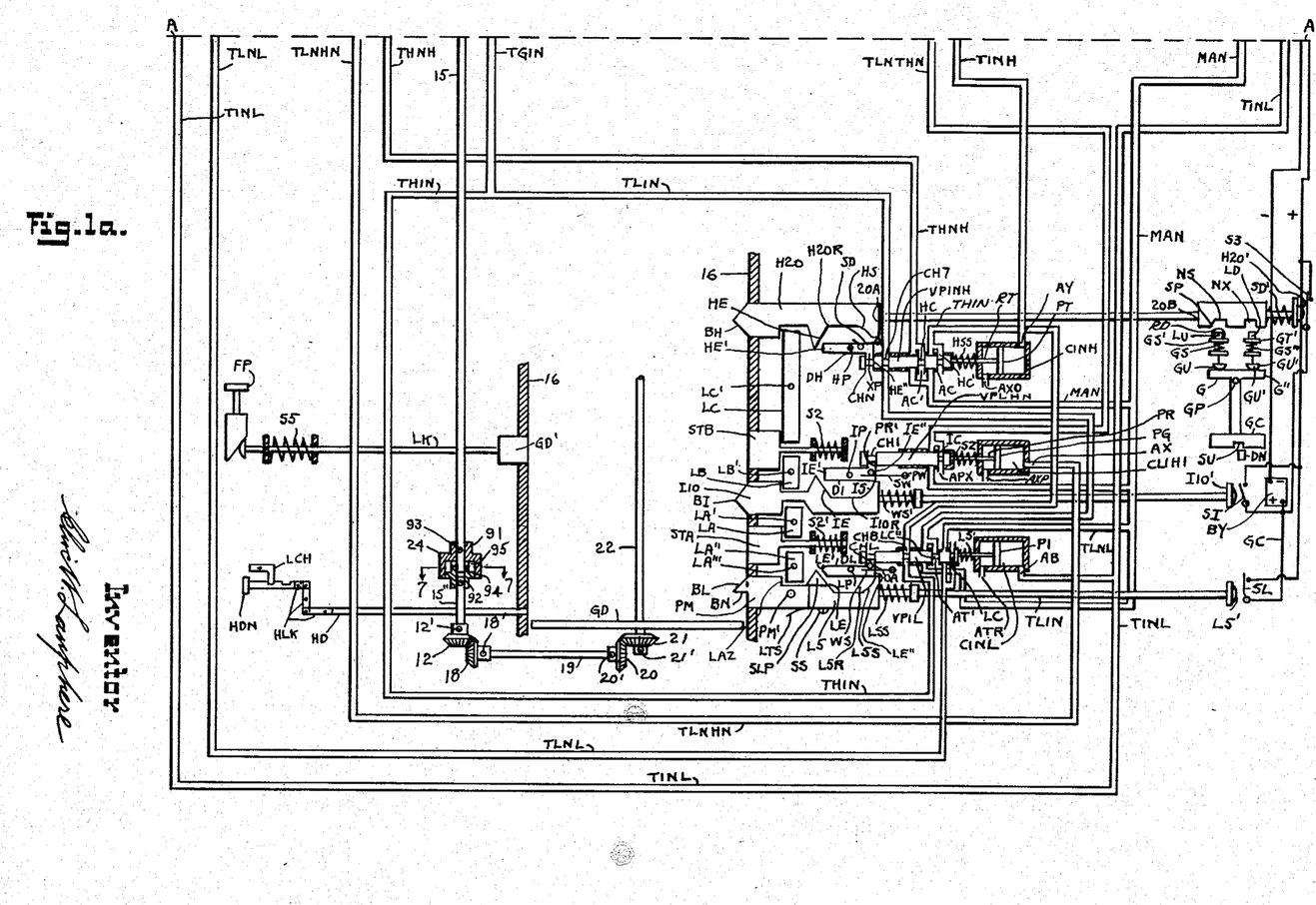

The various supports, bearings, and connections and all the structures comprising this invention can conform to known principles. The valves can be of cylindrical design enclosed in housings some of which are indicated by the characters VH, VHB, VHC, VHD, VHE, VHF, VHX, and VHZ. Three forward speeds are disclosed but more can be added if desired. In Figures 1 and 1a are shown elements which may include in combination three pneumatic cylinders L, I, H, that with other elements automatically actuate gear shifts. These cylinders may be provided with piston rods LR, IR, HR, each of which may have two offsets for actuating pawls that release valves or for actuating valves directly as the case may be. These valves may be disposed adjacent to the neutral and gear positions of the piston rods. Other valves and their actuating pawls can be positioned adjacent to a speed control and cooperating plungers that operate these pawls. All of the valves cooperate with tubes or conduits also termed connection means that connect the various pneumatic cylinders with the motor manifold. The cylinders L, I, H, by means of their piston rods actuate levers that operate the rails of the transmission.

Other cylinders retract various shift actuating valves upon completion of the shifts.

Provision is made for conventional gear shifting. (See Figures 1 and 2.) A lever is indicated at CH6 that projects above the floor of the car. It may be provided with a shortened top arm adapted to receive a detachable handle (handle not shown) and can be similar to this type of lever well known in the art. Its lower arm can engage notches NU and NU' in the usual rails HI and RL respectively. These rails in the conventional manner may actuate clutches CU and CRL designed to tie the various gears on a main shaft to this shaft. The main shaft can comprise three sections, a motor shaft DS'', a clutch shaft DS termed the driving means, and a third shaft DS' termed the driven means. A gear H secured to shaft DS meshes with a gear H' that may be secured to a counter shaft CS by means of which shaft DS can drive shaft CS.

Manual shifting means for actuating shifts between low, neutral, and reverse in conjunction with the automatic shifting mechanism will now be described. (See Figure 1). A handle HM can be disposed in a position convenient for operation by the driver and may be suitably attached to a shaft PH. An arm LM can be attached to this shaft. A link LIP may be pivotally connected at PPC to this arm and at PIL to a rod TR shown broken away and continued at the rear of the transmission case TC. This rod can be pivotally connected at RP to a lever TL, which may be pivotally attached at PO to a support ST that can be secured to any suitable part of the chassis. This lever may be provided with a forked end FO that can be designed to straddle a post HSP mounted on rail RL. A yoke YRL carried by this rail can be designed to straddle a shiftable clutch unit CRL that is splined to shaft DS'. This unit may be provided with external toothed members RG and LG, but it is to be understood that any suitable type of clutch unit may be used.

The shifting of gears by handle HM and linkage may be accomplished as follows.

Neutral to reverse

With the clutch pedal CLP depressed the handle HM is moved forwardly to its reverse gear position which by its connections to rail RL actuates clutch unit CRL causing member RG to engage an internal toothed member RG' immovably secured to a reverse gear R. This gear is loosely mounted on shaft DS' but with the engagement of members RG and RG' becomes tied to it setting the transmission in reverse gear. With rail RL at reverse gear position a curved offset O' on it actuates a valve VR in opposition to its spring SPR. This lines up a channel CXR encircling it with a tube TRM connected with the manifold (connection not shown). A tube TR' connects this channel with a chamber in an optical indicator containing a plunger RP. (This tube shown broken for obvious reasons.) The manifold suction draws this plunger in opposition to its spring and lines up a letter R on it with a window W, (see Figure 4), indicating that reverse gear is in mesh. When rail RL is shifted from reverse gear position valve VR urged by spring SPR returns to normal position lining up channel CXR with aperture APV (position shown in Figure 1). This allows atmosphere to enter the plunger chamber through tube TR' and spring S returns the plunger to normal position while air leaves the chamber through aperture APR.

Reverse to neutral shift

The clutch pedal is depressed and handle HM moved rearwardly to its neutral position actuating rail RL and with it the clutch unit CRL which disengages members RG and RG' from each other freeing gear R from shaft DS'. Rail RL at neutral position by means of the offset O' on it actuates a valve VN in opposition to its spring SPN lining up a channel CXN in it with a tube TNM. This tube has a connection with the manifold (connection not shown). From this channel a tube TN continues to a valve VI adjacent to rail HI. When this rail is at its neutral position a curved offset X' carried by it holds valve VI against its spring SKV lining up its encircling channel C4 with tube TN. From this valve tube TN (shown broken) continues to a chamber for a plunger NP in the indicator OI. With rails RL and HI at neutral positions the letter N will appear in its respective window. When rail RL is at neutral position and rail HI is not, valve VI blocks tube TN and although valve VN is in line at its channel with this tube the manifold can not draw air from the optical indicator, thus preventing plunger NP moving to its projected position. With these rails in the positions just mentioned atmosphere enters tube TN by means of an aperture or port VI' in valve VI which allows plunger NP to remain at normal position under the urge of its spring. When rail RL is shifted from neutral position valve VN is released which urged by its spring moves to its projected position lining up its channel CXN with aperture O. The manifold is then cut off from the optical indicator and atmosphere enters it through tube TN. Urged by its spring plunger NP moves to normal position while air leaves its chamber through aperture APN.

Neutral to low shift

With the clutch pedal depressed handle HM is moved rearwardly to its low gear position which by its linkage to rail RL actuates this rail and with it clutch unit CRL to effect an engagement of toothed members LG and LG'. Member LG' is immovably secured to a gear L which is loosely mounted on shaft DS' but with the movement of unit CRL gear L becomes tied to this shaft thus setting the transmission in low gear position. With rail RL at low gear position it actuates a valve VZ to line up a channel C8 in it with a tube TIL connected to the manifold (connection not shown). This tube leads to the chamber for a plunger LP in the optical indicator (connection not shown). When valve VZ is actuated plunger LP apears in its window. When rail RL is shifted from low gear position this plunger returns to normal position similarly to plungers already described.

Low to neutral shift

This shift is accomplished by actuating handle HM forwardly which disengages members LG and LG' freeing gear L from shaft DS'.

For cooperation with the automatic gear shifting mechanism to be detailed in proper sequence shortly an automatic clutch and automatic gas valve can be provided. Any suitable type of automatic clutch may be used. One type and its cooperating automatic gas valve will now be described. The clutch is indicated at CA and it connects shafts DS'' and DS. Pivotally connected at CPX to the clutch pedal CLP is a link PL which is also pivotally connected at CXP to a piston rod CR of a pneumatic cylinder CC. This rod may be provided with a slot BSO to permit the ingress to and the egress of air from this cylinder. An aperture CAR in cylinder CC may be connected by a tube TCL with a valve CLV which may have a plunger CIL actuable in one direction by a spring SCI and in the opposite direction by a solenoid SOL. A key piece KP can be provided to engage this plunger to prevent its rotation. A slot SCV in plunger CIL can be provided to connect tube TCL with an aperture CA2 in the plunger housing open to the atmosphere. This housing also has an aperture V open to the atmosphere that communicates with the chamber for plunger CIL. Aperture CA2 functions when this plunger is at normal position a condition present when solenoid SOL is not energized. When this solenoid is energized through means to be described in the description of the automatic gear shifts at the proper place the manifold by means of tubes TM and TCL, channel CLX which is then in line with these tubes, and aperture CAR draws air from cylinder CC. The piston CPC and rod CR of this cylinder then move towards aperture CAR which by means of link PL and pedal CLP disengage the clutch CA thus functionally disconnecting shafts DS'' and DS. Simultaneously by means of a link LX pedal CLP actuates a gas valve GV to reduce the flow of gas to the motor MOT. Upon completion of each gear shift solenoid SOL becomes deenergized through means to be described shortly and plunger CIL returns to normal position under the urge of its spring SCI allowing atmosphere to enter aperture CAR in cylinder CC by means of tube TCL and aperture CA2 in valve CLV, which permits the piston rod CR to move away from aperture CAR while air leaves cylinder CC through slot BSO, this rod moving under the urge of the clutch in the usual manner. With this movement the clutch becomes engaged and the gas valve returns to its open position.

The speed control or governor used in this device will now be described. It may be provided with a housing 16 that can be attached to the drive shaft housing (shaft housing not shown) or any suitable part of the chassis. The housing 16 can be cylindrical or angular as required and can be disposed perpendicularly or otherwise. In Figure 1a it is shown in horizontal position in order to better disclose the correlation of its cooperating elements. A gear 28 may be secured to shaft DS' by a pin 28'. This gear can mesh with a beveled gear 31 that may be secured to a shaft 15 by a pin 15'. This shaft can be composed of two sections designated 15 and 15'' which may be coupled by an overrunning clutch 24. A gear 12 can be provided which can be secured by a pin 12' to shaft 15''. This gear can mesh with a beveled gear 18 that may be secured by a pin 18' to another shaft 19. Another beveled gear 20 may be secured by a pin 20' to shaft 19 and this gear can mesh with a beveled gear 21 which may be secured to a shaft 22 by a pin 21'. Unit 24 will be described shortly. Shaft 22 can be supported in walls 25 and 41 of the governor housing (see Figure 6). A thrust bearing may be provided to cooperate with this shaft. It can comprise one segment 29 and another segment 30 with a circular raceway containing balls 17 disposed between them. This bearing can be placed adjacent to wall 25. Another thrust bearing disposed adjacent to wall 41 can cooperate with shaft 22. This bearing may comprise segments 26 and 27 and a raceway with balls 48. A collar or disc 52 can be secured to shaft 22. This disc may be provided with a series of offsets 59 arranged in pairs circularly disposed. A fin 32 can be pivoted at 60 in each pair of offsets. A spring 32' can connect each fin with shaft 22. An arm 61 and a weight 62 may be attached to each fin. Each arm can rest between a pair of offsets 61', and these offsets may be carried by a disc 49. Disc 49 may be splined on shaft 22. Another disc GD provided with an offset 45 may be loosely disposed on shaft 22. Disc 49 can have a hub 49' that interlocks at 49'' with disc GD. Extending from disc GD is a finger 70 that can engage a slot 71 in the housing 16. This finger prevents rotation of disc GD. Offset 45 on disc GD may be provided with a circular raceway and balls 56 for cooperation with disc 49. A spring 66 may be provided that can encircle shaft 22 and which can rest on disc GD and wall 41 inside offsets G' and 41' respectively. The plungers also termed reciprocating means are indicated at L5, I10, and H20. They may be disposed in wall 16 and can have beveled ends adapted to cooperate with disc GD.

Figures 2, 3, 4, 5, 6, 7, 8, 9, 10:
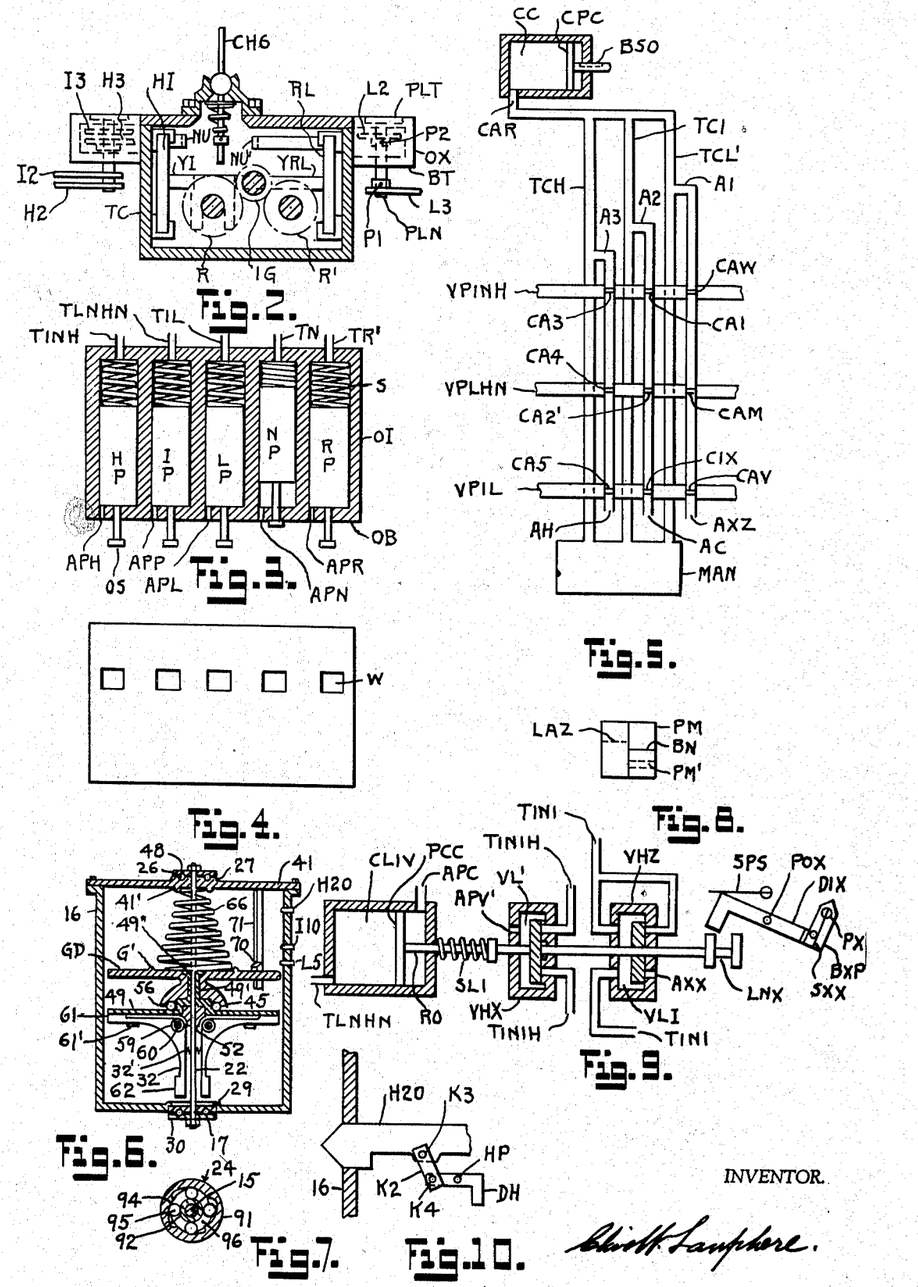

Details relating to the overrunning clutch 24 will now be given. It may comprise a sleeve 91 that can be secured to shaft 15 by any suitable means 93 said sleeve overlapping another sleeve 92 at 94 the latter sleeve being secured to shaft 15'' similarly to sleeve 91. These sleeves are so formed that their overlapping provides pockets 96 that are wider on one side than the other. In these pockets can be disposed rollers 95. When shaft 15 and sleeve 91 rotate counter-clockwise the rollers occupy the narrow side which affords a driving connection between shafts 15 and 15'', both shafts rotating similarly. When shaft 15 rotates clockwise the rollers are disposed in the wide side of the pockets and shaft 15'' is not actuated. This condition is present when the transmission functions in reverse gear which prevents actuation of the governor thus preventing actuation of any automatic shifts. Any suitable type of overrunning clutch may be used in this device.

The elements that function during automatic gear shifting will now be described.

*Low to intermediate shift*

In assembling the car the piston rod LR of cylinder L is set at its low gear engaging position and the rail RL is set at its neutral position. With rod LR so placed cylinder L can actuate the shift of rail RL from low gear position which is the position the driver shifts to before starting the car forward. After this shift has been made the car is speeded up in the usual manner. Shaft DS' by means of gears 28 and 31, shafts 15 and 15'', gears 12 and 18, shaft 19, gears 20 and 21 rotates shaft 22 and with it disc 52. The centrifugal force developed will cause weights 62 to swing away from this shaft and therewith arms 61 to move in the direction of wall 41. These arms will urge disc 49 in the same direction thereby pushing disc GD ahead of it. By properly proportioning the centrifugal elements disc GD can at the desired predetermined speed (assumed to be five miles per hour) contact surface BN of a member PM pivotally mounted on plunger L5 at PM'. As disc GD continues its movement the member PM simply swings on its pivotal pin which allows this disc to pass by this plunger without actuating it. After disc GD has passed member PM a spring LTS secured to plunger L5 at SS returns member PM to normal position to rest against a stop SLP. If plunger L5 were actuated at this time its end L5' would close an electric switch SL thereby actuating solenoid SOL which would then be connected with the battery BY. Actuation of this solenoid as previously described would cause disengagement of the clutch CA which would prevent the motor from increasing the car speed and the car would remain in low gear when travelling on a level road or when ascending a grade. After passing plunger L5 disc GD brushes across the beveled surface BI of plunger I10 at the desired predetermined speed (assumed to be ten miles per hour). This plunger is actuated to its retracted position out of the path of disc GD which as it moves actuates levers LA and LB causing them to swing on their respective pins LA' and LB'. These levers urge stops STA and STB respectively into the path of disc GD blocking movement of this disc in either its progressive or regressive movement. While blocked this disc can not actuate any other plunger which prevents actuation of another gear shift while the one now being described takes place. During the movement of plunger I10 to its retracted position (to the right as viewed in Figure 1a) its sloping surface IE pushes the end IE' of a pawl DI causing it to pivot on a pin IP. Simultaneously the end IE'' of this pawl moves into a recess I10R coming to rest in contact with a curved surface IS forming a wall of this recess. This curved surface corresponds with the path the end IE'' travels in. A prong PR' integral with the end IE' moves with it and in so doing leaves an encircling notch CHI in a valve VPLHN which releases this valve whereupon its spring SZ urges it to its projected position, i. e. to the left of the position shown in Figure 1a. A spring SW tends to urge pawl DI out of recess I10R but valve VPLHN blocks this movement as prong PR' and notch CHI are not in alignment at this time. Simultaneously with the disengagement of prong PR' with notch CHI the end I10' of plunger I10 closes a switch SI and therewith an electric circuit connecting the battery BY with solenoid SOL. Switches for other gear shift circuits will be described at the proper places. The solenoid SOL is thus energized and actuates disengagement of the clutch CA and closure of the gas valve GV to its desired position. When valve VPLHN moves to its projected position it lines up an encircling channel IC in it with tube TLNTHN which with tube TLN connects the manifold with an aperture or port LAN in cylinder L. Air is thus drawn from aperture LAN. Simultaneously atmosphere enters a port L' by means of a tube TLNL which at this time receives air through port AL' in a valve VLN. This valve is at retracted position i. e. to the left of the position shown in Figure 1 and its encircling channel LNC connects port AL' with tube TLNL. A pawl DIL at its end DX holds valve VLN in this position. With air leaving port LAN and entering port L' the piston LP and its rod LR move towards port LAN. As rod LR has a post LRP that cooperates with a slot L4 in a lever arm L3 this arm rotates a shaft PLN to which it is attached by a pin PI. This shaft swings an arm L2 secured to it by a pin P2. Shaft PLN can be supported at one end in a plate PLT which may be secured by screws SPE to the walls OX of an offset in the transmission case (see Figures 1 and 2). The other end of this shaft can be supported in the wall BT of this offset. When arm L2 swings, its end Z enters a notch LN in rail RL and actuates it from low gear position to its neutral position said arm coming to rest at the position indicated in Figure 1. This rail carries yoke YRL with it and thereby actuates the clutch unit CRL which disengages toothed members LG and LG' freeing gear L from shaft DS'. Tube TLNTHN also leads to an aperture HAN in cylinder H by means of a tube THN. As piston rod HR is at neutral position at this time, the suction of air from this aperture does not actuate it. The tube THN is connected by means of a tube TINIH with an aperture I' in cylinder I. The purpose of this connection will be described at the proper place. Tube TINIH does not function when air is drawn from aperture LAN as it is blocked by a valve VHI the channel CHH of which is not in line with this tube at this time said valve being to the right of the position it is shown in where it is held by a pawl DHI.

Just before rod LR reaches its neutral position an offset LO carried by it brushes across a beveled end BX of a member BXP that is pivoted on a pin PZ carried by a pawl DIX. A stop SXP prevents member BXP swinging on its pivotal support during the movement of rod LR from low to neutral position. Consequently pawl DIX is actuated by this rod and swings on its pivotal pin POX causing a prong PRL integral with said pawl to leave an encircling notch LNX in a valve VLI thereby releasing this valve which urged by its spring SLI moves to its projected position. Valve VLI actuates a piston PCC and a rod RO connected to said piston when this valve moves to projected position. Piston PCC can move freely in its cylinder CLIV as air enters at aperture AZC by means of a tube TLNHN which communicates with the atmosphere at a port OZ in a valve VLHI (this valve being at the position shown) and air leaves at aperture APC. Valve VLI at projected position lines up an encircling channel CHX' in it with a tube TINI. This tube leads from tube TLN to an encircling channel VX in the valve VHI which at this time is at its retracted position i. e. to the right of the position shown in Figure 1. In this position channel VX is in line with tube TINI and air is drawn from aperture I' in cylinder I to which tube TINI is connected. As previously stated tube TINIH is connected to aperture I' and at this time air can enter this tube through aperture ATE in valve VHI as its channel CHH is in line with said aperture. To prevent atmosphere entering aperture I' while air is drawn from this aperture by tube TINI the tube TINIH is blocked by valve VLI. A channel CV in this valve connects two portions of tube TINIH when said valve is at retracted position but is out of line with this tube when valve VLI is at projected position. With the suction of air from aperture I' piston IP and rod IR move from neutral to intermediate gear position. This movement of rod IR swings an arm I2 by means of a post and slot connection. This arm can be connected by a pin to a shaft INP which may have another arm I3 secured to it. As arm I2 swings it rotates shaft INP thereby swinging arm I3. The end of arm I3 enters notch IH in rail HI, actuates this rail to intermediate gear position, and leaves this notch coming to rest at the position indicated by dotted lines I2'. By means of a yoke YI that can be similar to yoke YRL rail HI actuates a clutch unit CU splined on shaft DS'. This produces an engagement of a toothed member IG with an internal toothed member IG' and as member IG' is secured to gear GI this gear becomes tied to shaft DS'. As gear GI meshes with a gear GI' secured to counter shaft CS the transmission is set in intermediate gear. During the movement of rod IR from neutral to intermediate gear position air enters cylinder I at aperture IAN by means of tube TGIN and its feeder tubes TLIN and THIN. These tubes are open to the atmosphere at aperture AC in valve VPINH and at aperture AT' in valve VPIL. When rod IR moves to gear position its offset IO' swings pivotal members DHX and DHA on their respective pivotal pins DX2 and DHP. Springs S3 and S4' yieldingly urge members DHX and DHA against their respective stops DHZ and DHS. Members DHX and DHA swing without actuating their respective pawls DIL and DIH on their pivotal supports DLX and DPH. When rod IR approaches intermediate gear position a beveled surface TED on an offset IO carried by this rod brushes across and actuates a valve VLHI which lines up a channel CH2 in it with a tube TLNHN. Surface A2 of offset IO will be in contact with surface B2 of valve VLHI when rod IR reaches intermediate gear position. This line-up permits the manifold to draw air from a cylinder CLIHI at its aperture AX by means of tube or conduit TLNHN. Piston PG in this cylinder is drawn towards aperture AX while atmosphere enters aperture AXP in said cylinder. This movement of piston PG and therewith rod PR actuates valve VPLHN which is connected to said rod, allowing the pawl DI urged by its spring SW to enter notch CHI and hold this valve retracted. This releases plunger IIO and its spring WS' urges it to its projected position, i. e. the position shown in Figure 1a. This movement of plunger IIO allows switch SI to open which permits plunger CIL in valve CLV to return to normal position and the clutch CA to become engaged and the gas valve GV to close. With plunger IIO at projected position levers LA and LB are released and the stops STA and STB return to normal positions under the urge of their respective springs S2' and S2, leaving disc GD free to move progressively or regressively. When channel CH2 in valve VLHI lines up with tube TLNHN the manifold in addition to drawing air from cylinder CLIHI draws it from cylinder CLIV at aperture AZC while atmosphere enters this cylinder at aperture APC. This actuates piston PCC towards aperture AZC and with it rod RO and valve VLI. With this valve at retracted position the prong PRL of pawl DIX enters notch LNX under the urge of spring SPS which holds said valve retracted. At retracted position valve VLI blocks tube TINI preventing manifold suction through it and at the same time allowing atmosphere to enter aperture I' in cylinder I through this tube as the channel CHX' is in line with aperture AXX. When channel CH2 in valve VLHI lines up with tube TLNHN and air is drawn from cylinders CLIHI and CLIV the manifold also draws air from cylinder CHI' at aperture AA. At this time piston PHI of this cylinder is adjacent to aperture AA so no actuation of this piston occurs.

Relevant to the cooperation of valve VPLHN, tube TLNTHN with its continuation TINI, cylinder I and valve VLHI with tube TLNHN and cylinders CLIV and CLIHI the following details are given: Valve VPLHN could have a projection of one inch from prong PR' to its projected position. Offset IO could move one-half inch while its tapered edge TED brushes across valve VLHI. This would move this valve one quarter inch. If cylinders CLIV and CLIHI are half the size of cylinder I the tube TLNHN will be half the diameter of tubes TLN and TINI. This will assure a complete movement of rod IR with its offset IO so surface A2 will be in contact with surface B2 of valve VLHI before cylinders CLIV and CLIHI fully retract their respective valves VLI and VPLHN. Too early retraction of these valves would block tubes TLN and TINI which would stop the movement of rod IR before it had travelled its required distance. Of course the dimensions here given can be varied in accordance with the principles just outlined. These principles also apply to a valve VIH and its cooperating elements that function in the shift of intermediate to high, and to a valve VIN with its cooperating elements that function in the shift of intermediate to low. These shifts will be described at their proper places.

Tube TLNHN can have a connection with a chamber in the optical indicator for a plunger IP (connection not shown). With this tube functioning the plunger IP will be drawn to its projected position with its letter I at its respective window. When rod IR leaves gear position in the shifts of intermediate to low and intermediate to high valve VLHI urged by its spring SZX lines up its channel CH2 with aperture OZ said aperture communicating with the atmosphere. Air can thus enter tube TLNHN and the chamber for plunger IP while air can leave this chamber at aperture APP allowing the spring for this plunger to actuate it to normal retracted position.

In Figure 9 is disclosed a valve that can be used as an alternative for valve VLI. The insignia for it are similar to those shown in Figure 1 with the addition of the characters APV' which designate an aperture communicating with the atmosphere. This valve differs from valve VLI in Figure 1 in that it may have two parts each part enclosed in a separate housing these housings designated by characters VHX and VHZ.

Should disc GD reactuate plunger IIO before actuating another plunger thus retripping pawl DI valve VPLHN would not project as long as the motor were functioning because cylinder CLIHI would hold it retracted. And even if this valve could project it would not at this time actuate any shift. If the motor were not functioning when this plunger were reactuated valve VPLHN would project but as soon as the motor functioned it would be retracted by cylinder CLIHI.

Should the driver fail to manually actuate the shift to low gear when starting the car and should the car coast down grade, a shift of rod LR from low gear position would automatically occur when the car attains the requisite speed for actuating plunger IIO. Rail RL would be at its neutral position and the end z of lever L2 would strike this rail at the point marked X instead of entering notch LN. To prevent this interference a slidable member A can be mounted on rail RL between guides B and C. A spring OD secured to this rail by a screw at E will hold member A at normal position. When the end Z hits member A at X it will move it in opposition to the spring OD forcing this member out of its path. This will permit the end Z to enter notch LN and continue its movement to its neutral position.

Intermediate to high shift

After the shift to intermediate is completed and the car attains the requisite speed assumed to be twenty miles per hour disc GD will actuate plunger H20 by brushing across its beveled surface BH. This plunger will move to retracted position and swing lever LC on its pivot pin LC'. Lever LC actuates stop STB in opposition to its spring into the path of disc GD which prevents this disc actuating any other plunger while plunger H20 is retracted. In its retractive movement this plunger at its sloping surface HE brushes across the end HE' of a pawl DH pushing it out of its path causing this pawl to swing on its pivotal support HP which withdraws a prong XP integral with said pawl from a notch CHN in a valve VPINH. The end HE'' moves into a recess H20R in plunger H20 and comes to rest in contact with a curved surface HS of this recess. The withdrawal of prong XP allows a spring HSS carried on a rod extension of valve VPINH to urge said valve to projected position. Plunger H20 at retracted position closes a switch S3 and therewith an electric circuit which energizes solenoid SOL thereby actuating disengagement of the clutch CA and closure of the gas valve GV. With valve VPINH at projected position its channel HC' lines up with a tube THIN that leads to tube TGIN which continues to aperture IAN in cylinder I. This allows the manifold to draw air from cylinder I through this aperture which actuates piston IP and its rod IR towards said aperture to their neutral positions. Valve VPINH has another channel HC the purpose of which will be described shortly. The movement of rod IR from intermediate gear to neutral position swings arm I2 thereby rotating shaft INP which swings arm I3 in the opposite direction to its movement in the shift of low to intermediate. Rail HI is thus actuated to its neutral position and with it the clutch unit CU freeing members IG from IG' and therewith gear GI from shaft DS'. As the rod IR approaches its neutral position its offset I0' brushes across the beveled end of member DHA mounted on pin DHP carried by pawl DIH, that is pivotally mounted on pin DPH. A stop DHS prevents offset I0' actuating a pivotal movement of member DHA when rod IR moves from intermediate gear to neutral position. Consequently pawl DIH swings on its pivotal pin and a prong J of this pawl leaves an encircling notch N2C in a valve VHNH. This valve urged by its spring ISS moves to the right as viewed. At this position a channel CIO in valve VHNH lines up with tube THNH. As this tube leads from the manifold to channel HC in valve VPINH and to aperture H' in cylinder H air is drawn from this aperture which actuates piston HP and rod HR from neutral to high gear position. This movement of rod HR which can have a post and slot connection with an arm H2 swings this arm which rotates a shaft HNP to which it may be attached by a pin. Shaft HNP can be supported in the case TC similarly to shaft PLN. The shaft HNP swings another arm H3 that can be suitably secured to it. The end of this arm enters notch IH in rail HI actuating this rail to high gear position where it leaves said notch coming to rest at the position indicated by dotted lines H2'. Rail HI carries yoke YI with it which moves the clutch unit CU thereby actuating an engagement of toothed members HG and HG'. The member HG' is secured to gear H which is rigidly attached to shaft DS and as shafts DS and DS' are loosely connected at HO' the meshing of members HG and HG' ties these shafts together setting the transmission in direct drive i. e. high gear. When rod HR approaches high gear position an offset HRO carried by it brushes across and actuates a valve VIH in opposition to its spring STL which lines up a channel CH3 in it with a tube TINH. At high gear position a surface AE on offset HRO is in contact with a surface BE on valve VIH. The alignment of channel CH3 and tube TINH allows the manifold to draw air from an aperture AY in a cylinder CINH. Atmosphere can enter this cylinder at aperture AXO. Tube TINH in addition to connecting the manifold with cylinder CINH connects it with cylinder CHNH at aperture AP. Air can enter cylinder CHNH at aperture ATX. Tube TINH is connected to a tube TINL by another tube TCLN for the purpose of affording simultaneous functioning of tubes TINH and TINL and cylinders CHNH and CLNL which these tubes respectively actuate which is necessary upon the completion of the shifts of intermediate to high and intermediate to low as the rod IR trips pawls DIH and DIL in both these shifts allowing valves VHNH and VLN to project each of which must be retracted by its respective cylinder at the end of these shifts. As tube TINL in addition to being connected to cylinder CLNL at aperture AL is connected to cylinder CINL at aperture AB air is simultaneously drawn from cylinders CLNL and CINL with its withdrawal from cylinders CINH and CHNH. The projection of valve VLN in the shift now being described does not actuate any parts as its cooperating tube TLNL is blocked by a valve VPIL as its channel LC is disaligned with this tube. These valves function in the intermediate to low shift and will be described at the proper time. When air is drawn from cylinder CINH at aperture AY piston PT and rod RT move towards this aperture retracting valve VPINH allowing pawl DH to dog it at the position shown in Figure 1a. This pawl movement releases plunger H20 which urged by its spring SD' projects permitting lever LC to pivot which in turn allows stop STB urged by its spring S2 to return to retracted position out of the path of disc GD. The projection of plunger H20 releases switch S3 which opens deenergizing solenoid SOL allowing clutch CA to become engaged and gas valve GV to return to open position. Reactuation of this plunger before any of the other plungers are actuated does not actuate any gear shift as rods IR and HR have already shifted to their proper positions. When air is drawn from cylinder CHNH at aperture AP piston PX and rod RH are actuated towards this aperture which by means of this rod and its connection to valve VHNH retract said valve allowing pawl DIH urged by its spring S4 to dog it in notch N2C. At this position valve VHNH blocks tube THNH. With the withdrawal of air from cylinder CLNL at aperture AL piston PU and its rod connecting this piston to valve VLN move towards aperture AL thereby retracting said valve where pawl DIL urged by its spring SIL engages it in notch CHX and holds it in fixed position. The suction of air from aperture AB in cylinder CINL does not actuate any parts as its piston PI is at retracted position at this time, this piston being at projected position only during the shift of intermediate to low gear. When the rod HR moves from neutral to high gear position in the shift of intermediate to high now being described its offset HO brushes across the beveled end BHI of a member HX causing it to pivot on a pin HV carried by a pawl DHI without actuating this pawl. In the gear shift now being detailed the following is devised to prevent air entering aperture IAN from a tube TLIN that draws air from this aperture in the shift of intermediate to low gear. When the valve VPINH is at retracted position during the shift of intermediate to low a channel CH7 is in line with tube TLIN but when this valve is at projected position in the shift of intermediate to high the channel CH7 is not in alignment with this tube consequently although atmosphere enters it through aperture AT' open to the atmosphere at channel LC" in valve VPIL air can not pass valve VPINH. Therefore air can not enter aperture IAN from tube TLIN while tube THIN draws air from it. To prevent air entering tube TINH by means of tube TINL and aperture VN' in valve VIN upon the completion of the intermediate to high shift when valve VIH is actuated this valve is provided with a channel CVH that normally connects two sections of tube TINL but which is disaligned with these sections at this time. During the shift of intermediate to low these two sections are connected by the channel CVH. A plunger HP in the optical indicator can be actuated by tube TINH which can be connected to the chamber for this plunger (connection not shown). Similarly to the other plungers already described the plunger HP will show a letter H in its window indicating that high gear is functioning. When rod HR leaves high gear position valve VIH returns to normal position lining up its channel CH3 with the aperture VH' communicating with the atmosphere thus allowing air to enter this chamber for plunger HP while it leaves this chamber through aperture APH. This plunger can then return to normal position under the urge of its spring S.

*Means for preventing or delaying the intermediate to high shift*

Manual means for preventing this shift will now be described. A dog GD' adapted to block disc GD can be actuated by any suitable linkage LK that may cooperate with a pedal FP. A spring S5 can hold this dog retracted out of the path of disc GD. Attention is called to the position of dog GD' in Figure 1a. Obviously this dog could be used for blocking disc GD when high speed functions.

Automatic means for preventing or delaying the intermediate to high shift will now be detailed. A gradient control which for practical purposes must be perpendicularly disposed may comprise a member GC pivoted at GP and two cooperating dogs LU and LD. When the car is ascending a grade the member GC at its lower end swings to the left as viewed its upper end to the right. An arm G of member GC moves into contact with a curved surface GU of dog LU actuating this dog in opposition to its spring GS which is compressed against a stop GS'. The upper end of this dog enters a notch NS in plunger H20. This notch may be provided with a sloping surface SP. Member GC and dog LU thus offer resistance to the movement of disc GD in its progressive movement said resistance varying in proportion to the degree of the grade. By properly proportioning these parts disc GD can actuate plunger H20 and valve VPINH at a predetermined speed deemed suitable which is assumed to be thirty miles per hour for a very steep grade at which time the dog LU will be forced entirely out of notch NS. The shift from intermediate to high will then occur. When the car is descending a grade of predetermined degree the control GC will swing to the right at its lower end and to the left at its upper end. An arm G" of member GC will contact a curved surface GU' on dog LD actuating this dog in opposition to its spring GS" which compresses it against a stop GT'. Dog LD enters notch NX in plunger H20, this notch being formed with straight sides. This will positively prevent the shift of intermediate to high as plunger H20 can not be actuated while the car is descending this predetermined grade. The gradient control GC can be locked out when the foot pedal FP and dog GD' are used by providing a notch SU in member GC said notch being adapted to receive a dog DN actuable by suitable linkage (linkage not shown) operable from the dash. The governor mechanism can be designed to prevent disc GD moving progressively beyond plunger H20. This will prevent member GC blocking the regressive movement of disc GD when the car speed decreases which could otherwise occur should the control GC have moved to a position that blocks the retractive movement of plunger H20. The dogs LU and LD with their springs serve to steady member GC against vibration. A roller RD could be suitably pivoted on dog LU for cooperation with the side SP of notch NS. Similar rollers indicated by dotted lines R2, R3, and R4 could be carried by offsets I0, HRO, and LO' respectively for actuating valves VLHI, VIH and VIN respectively.

*High to intermediate shift*

When the transmission is functioning in high gear and the car speed drops to ten miles per hour disc GD moving regressively actuates plunger I10 to its retracted position. As described in the shift of low to intermediate when this plunger is actuated the valve VPLHN moves to its projected position, lining up its channel IC with tube TLNTHN. The manifold as previously detailed draws air from apertures LAN in cylinder L and HAN in cylinder H. Piston rod LR is at neutral position so is not actuated, but piston rod HR by means of its piston HP is actuated from high gear to neutral position with the withdrawal of air from aperture HAN. While piston HP moves towards aperture HAN atmosphere enters aperture H' in cylinder H. At this time valve VHNH is at its retracted position and its channel CIO in line with aperture ATZ. This aperture feeds atmosphere to tube THNH which is connected to aperture H' affording the passage of air to the latter aperture. With the movement of rod HR to neutral position arm H2 swings oppositely to its movement in the shift of intermediate to high. This arm rotates shaft HNP which swings arm H3 causing its end to enter notch IH in rail HI actuating this rail from high gear to neutral position, the arm H3 coming to rest clear of this rail. With this movement of rail HI the yoke YI actuates the clutch unit CU which disengages members HG and HG' freeing shafts DS and DS' from each other. Before rod HR reaches neutral position its offset HO brushes across the beveled end BHI of pawl DHI causing it to pivot on a pin HY whereupon its prong T leaves a notch CH9 in valve VHI, allowing a spring SHI to urge this valve to its projected position i. e. the position shown in Figure 1. Its channel CHH lines up with tube TINIH allowing the manifold to draw air from aperture I' in cylinder I thereby actuating piston IP and rod IR from neutral to intermediate gear position. This rod swings arm I2 thereby rotating shaft INP which swings arm I3 oppositely to its movement in the shift of intermediate to high. Arm I3 enters and leaves notch IH in rail HI coming to rest clear of this rail at the position shown by the dotted lines I2'. In making this movement arm I3 actuates rail HI from neutral to intermediate gear position and as in the shift of low to intermediate the clutch members IG and IG' become engaged tying gear GI to shaft DS'. During this movement of rod IR its offset I0' does not trip pawls DIL and DIH as members DHA and DHX pivot on their respective pins DHP and DX2. When rod IR reaches intermediate gear position it actuates valve VLHI as described in the low to intermediate shaft. This alignment of channel CH2 with tube TLNHN allows the manifold to draw air from cylinder CHI' through aperture AA while air enters this cylinder at aperture APH'. Piston PHI is actuated towards aperture AA which by its connection with valve VHI retracts this valve permitting pawl DHI urged by its spring SIX to engage the notch CH9 in it. Valve VHI at this position blocks tube TINIH from any manifold suction but by means of its channel CHH allows atmosphere to enter this tube through aperture ATE. Tube TLNHN is connected to cylinder CLIV at aperture AZC but at this time piston PCC is at its retracted position so the suction in this tube does not actuate this piston. Tube TLNHN as described in the low to intermediate shift is also connected to cylinder CLIHI at aperture AX so the suction in this tube retracts piston PG and its rod PR which pulls valve VPLHN to retracted position while air enters cylinder CLIHI at aperture AXP. Pawl DI dogs this valve and holds it retracted, thereby cutting off the manifold suction through tube TLNTHN, preventing any suction from apertures HAN and LAN in cylinders H and L respectively. The retraction of valve VPLHN allows plunger I10 to project urged by spring WS' permitting levers LA and LB to return to normal positions under the urge of stops STA and STB respectively which are themselves retracted by their respective springs S2' and S2. Upon completion of this shift plunger IP in the optical indicator functions as described in the low to intermediate shift. Reactuation of plunger I10 at this time does not actuate any shifts as the shifts it actuates have been made, i. e. rail HI has been actuated by rods HR and IR which are at neutral and intermediate gear positions respectively. As mentioned in the low to intermediate shift description both tubes TINIH and TINI are connected to aperture I' in cylinder I. During the shift of high to intermediate just detailed tube TINI is in communication with the atmosphere at aperture AXX as channel CHX of valve VLI is in line with this aperture. To prevent air entering aperture I' at this time tube TINI is blocked by valve VHI as a channel VX in this valve that connects two sections of tube TINI when this valve is at retracted position is out of line with these sections.

Intermediate to low shift

With the transmission functioning in intermediate gear and the car travelling at a predetermined speed assumed to be five miles per hour by properly proportioning the governor and cooperating elements disc GD will brush across the surface BL of member PM on plunger L5. This member will not pivot on its pin PM' as the stop SLP blocks it. Plunger L5 will therefore be actuated to retracted position closing switch SL and its connection to solenoid SOL thereby actuating disengagement of clutch CA and closure of gas valve GV. As this plunger moves to retracted position an offset LAZ on it actuates lever LA" which urges stop STA into the path of disc GD blocking it from actuating another plunger at this time. In moving to retracted position plunger L5 by means of an offset LE pushes an arm LE' of pawl DL out of its path. This swings pawl DL on its pivotal support LP and prong OA of this pawl moves out of a notch CHL in valve VPIL while an arm LE" simultaneously enters a recess L5R in plunger L5 coming to rest against a curved surface L5S thereby holding this plunger retracted. Valve VPIL urged by its spring LS' moves to projected position lining up a channel LC" in it with tube TLIN that leads from the manifold to its continuing tube TGIN which leads to aperture IAN in cylinder I. The manifold sucks air from this aperture actuating piston IP and its rod IR from their intermediate to neutral positions. During this movement of piston IP atmosphere enters aperture I' in cylinder I by means of tube TINIH that is connected with aperture ATE in valve VHI and by means of tube TINI connected to aperture AXX in valve VLI. As tube THIN that functions in the intermediate to high shift connects with aperture IAN in cylinder I as well as tube TLIN that functions in the shift of intermediate to low now being described and as tube THIN is open to the atmosphere at aperture AC in valve VPINH air is prevented from entering aperture IAN by having tube THIN cooperate with a channel CH8 in valve VPIL which with this valve projected is disaligned with tube THIN thus blocking air that enters aperture AC from passing to aperture IAN. With the movement of rod IR to neutral position when valve VPIL functions arms I2 and I3 function oppositely to their movements in the shift of this rod to its intermediate gear position. Rail HI is actuated to neutral position which by means of yoke YI disengages members IG and IG' thereby freeing gear GI from shaft DS'. In this movement of rod IR its offset I0' trips pawls DIL and DIH allowing valves VLN and VHNH under the urge of their respective springs SS and ISS to move to their projected positions. During these movements of said valves the pistons PU and PX to which they are respectively attached also move with the egress of air from cylinders CLNL and CHNH at apertures AT and ATX respectively. Simultaneously atmosphere enters apertures AL and AP by means of tube TINL and its cooperating aperture VN' in valve VIN and by tubes TCLN and TINH and aperture VH' in valve VIH with which tube TINH cooperates. Tripping pawl DIH at this time does not actuate any parts although the channel CIO in valve VHNH is in line with tube THNH because this tube is blocked by valve VPINH as its channel HC is disaligned with it. Tripping pawl DIL does actuate a shift as follows. This pawl releases valve VLN which lines up its channel LNC with tube TLNL this tube being connected with the manifold by channel LC in valve VPIL when this valve moves to projected position as already detailed. With tube TLNL functioning air is drawn from aperture L' in cylinder L and atmosphere simultaneously enters aperture IAN by means of tube TLNTHN and its communicating aperture APX in valve VPLHN. Piston LP and its rod LR are drawn towards aperture L'. This rod swings arms L3 and L2 oppositely to their movements in the low to intermediate shift thereby actuating rail RL from its neutral to low gear position which by means of yoke YRL and clutch unit CRL actuates member LG to engage member LG' tying gear L to shaft DS'. Upon completion of this shift arm L3 comes to rest clear of rail RL at the position indicated by the dotted lines L2'. In this movement of rod LR its offset L0 does not trip pawl DIX because member BXP simply pivots on pin PZ and under the urge of spring SXX returns to normal position coming to rest against stop SXP after offset L0 has passed it. When rod LR approaches low gear position its offset L0' brushes across valve VIN and comes to rest with surface A3 of this offset in contact with surface B3 on said valve. This lines up a channel CN in this valve with tube TINL allowing the manifold to draw air from aperture AB in cylinder CINL and from aperture AL in cylinder CLNL, also from aperture AP in cylinder CHNH and aperture AY in cylinder CINH by means of the connection TCLN with tube TINH. Cylinder CINL is open to the atmosphere at aperture ATR, cylinder CLNL at aperture AT, cylinder CHNH at aperture ATX, and cylinder CINH at aperture AXO. With the suction of air from these cylinders piston PI in cylinder CINL moves towards aperture AB and by its rod connection with valve VPIL retracts this valve allowing pawl DL to dog it under the urge of the spring WS, piston PU in cylinder CLNL moves towards aperture AL and by its rod connection to valve VLN retracts this valve whereupon pawl DIL dogs it; piston PX in cylinder CHNH and its rod RH move towards aperture AP retracting valve VHNH permitting pawl DIH to engage it; but piston PT in cylinder CINH does not move as it is at its retracted position at this time. To prevent atmosphere entering tube TINL through the connection TCLN and tube TINH when the suction just detailed occurs the tube TINH which is open to the atmosphere at aperture VH' in valve VIH is blocked by valve VIN as its channel CVN connecting two sections of tube TINH is disaligned with them. The retraction of valve VPIL allows plunger L5 to project under the urge of its spring LSS, this plunger being released when pawl DL urged by its spring WS moves out of recess L5R to dog this valve. The projection of plunger L5 releases switch SL and thereby solenoid SOL permitting clutch engagement and the return of gas valve GV to open position. With this plunger projected lever LA" and stop STA return to normal positions this stop moving out of the path of disc GD. With the shift from intermediate to low completed reactuation of plunger L5 does not actuate any shift as the elements are at their positions resulting from the actuation of this plunger.

Should disc GD actuate any plunger when the motor is not functioning, the plunger so actuated would release its cooperating valve, and cause the stops that cooperate with this plunger to block the movement of said disc. When the motor again started the released valve would be in a position that lines up its channel or channels with its cooperating tube or tubes as the case may be and the proper corresponding shift would occur.

Should the motor stall during any shift the shift would stop and the clutch and gas valve would return to normal positions. With a stalled motor this would make no difference. The shift would be completed when the motor again started.

An alternative means for actuating the pawls that cooperate with plungers L5, I10, and H20 is indicated in Figure 10. A link is indicated at K2 which can be pivoted at K3 on plunger H20 and at K4 on pawl DH. With this link the plunger H20 actuates a movement of pawl DH similar to the movement it makes when actuated directly by plunger H20, this pawl cooperating with valve VPINH as previously described.

Alternative means consisting of means entirely pneumatic for actuating the clutch CA and gas valve GV will now be described. See Fig. 5. The plunger actuated valves VPIL, VPLHN, and VPINH can be designed to contain encircling channels having connections with the manifold and with the clutch actuating cylinder CC which when these valves actuate the pneumatic shifting means will also actuate the clutch cylinder CC and therewith the clutch CA and gas valve GV.

When valve VPLHN is projected in the low to intermediate and high to intermediate shifts a channel CA2' in this valve lines up with a tube TCI. This tube extends from the manifold to valve VPLHN and to aperture CAR in cylinder CC affording clutch disengagement and gas valve closure. With the retraction of this valve upon completion of either of these shifts channel CA2' lines up with a tube A2 which extends from an aperture AC open to the atmosphere, to valve VPIL the channel CIX of which is in line with tube A2, to valve VPLHN the channel CA2' of which is in line with said tube, to valve VPINH the channel CA1 of which is in line with this tube, and to aperture CAR in cylinder CC.

When valve VPINH is projected in the shift of intermediate to high, a channel CA3 in it lines up with a tube TCH. This tube extends from the manifold to this valve and to aperture CAR in cylinder CC, affording clutch disengagement and gas valve closure. Upon the retraction of valve VPINH at the completion of the shift channel CA3 lines up with tube A3 which extends from an aperture AH communicating with the atmosphere to valve VPIL the channel CA5 of which is in line with this tube, to valve VPLHN the channel CA4 of which is in line with said tube, to valve VPINH the channel CA3 of which is in line with this tube, and to aperture CAR in cylinder CC.

With the projection of valve VPIL in the shift of intermediate to low a channel CAV lines up with a tube TCL'. This tube extends from the manifold to this valve and to aperture CAR in cylinder CC, permitting clutch disengagement and gas valve closure. When this valve returns to retracted position upon completion of the shift channel CAV lines up with a tube A1. This tube extends from an aperture AXZ open to the atmosphere to channel CAV which is in line with this tube, to channel CAM in valve VPLHN which is in line with said tube, to valve VPINH the channel CAW of which is in line with this tube, and to aperture CAR in cylinder CC.

When any of the valves VPIL, VPLHN, VPINH lines up its clutch and gas valve actuating channel with the tube it actuates it blocks all the tubes communicating with the atmosphere, and when these valves are at retracted positions all the tubes communicating with the atmosphere are open to permit the ingress of air to aperture CAR in cylinder CC allowing clutch engagement and the return of the gas valve to open position.

With these pneumatic clutch and gas valve actuating means the member PM on plunger L5 could be eliminated. Although disc GD in the shift of low to intermediate actuates this plunger, valve VPIL will be held retracted by cylinder CINL so no actuation of cylinder CC and thereby the clutch and gas valve can occur and no interference with increasing the car speed can take place. Should the motor be stalled when plunger L5 is thus actuated valve VPIL would project but as there would be no manifold suction the clutch would remain engaged. When the motor again started valve VPIL would be retracted and its clutch actuating channel closed.

Means for preventing actuation of all the pneumatic automatic mechanism will now be described. In the event that manual shifting by means of lever CH6 is to be done automatic operation can be prevented by a valve VX' that can be disposed in the main tube also termed general connection means adjacent to the manifold. This valve can be provided with an aperture AM open to the atmosphere which admits air to the pneumatic actuating tubes when this valve is turned to a position that cuts off the manifold suction. To positively prevent movement of disc GD a dog HD can be provided which may have suitable linkage HLK to a handle HDN that can be disposed in a position convenient for operation by the driver. When this handle is actuated to block this disc or when at the position shown in Figure 1a it can be held there by a latch LCH. If desirable this linkage can have a connection with valve VX' (connection not shown) which will permit actuation of dog HD and valve VX' simultaneously.

From the foregoing it will be seen that while a preferred embodiment of this invention has been disclosed, it is not desired to restrict the details to the exact construction shown, it being obvious that changes not involving invention may be made without conflicting with the spirit of the invention and the scope of the claims. The right to claim patentable features herein disclosed but not allowable in this application is not abandoned and is reserved for future applications.

What I claim is:

1. In a speed changing mechanism, driving means, driven means, speed changing means including in combination fluid means, said speed changing means adapted to change the speed ratio of said driving means and said driven means from a lower to a higher and from a higher to a lower ratio, a plurality of valvular means for controlling said fluid means, a plurality of reciprocating means adapted to actuate said valvular means, automatic centrifugal means adapted to automatically contact and actuate said reciprocating means, and control means adapted to be actuated by said reciprocating means, said control means adapted to prevent said automatic centrifugal means actuating a plurality of said reciprocating means simultaneously.

2. In a speed changing mechanism, driving means, driven means, speed changing means adapted to change the speed ratio of said driving means and said driven means, fluid means including in combination valvular means, said fluid means adapted to actuate said speed changing means, releasing means adapted to release said valvular means, reciprocating means adapted to actuate said releasing means, and automatic centrifugal means adapted to automatically contact and actuate said reciprocating means.

3. In a speed changing mechanism, automatic centrifugal actuating means adapted to be automatically actuated, a plunger adapted to be actuated by said automatic centrifugal actuating means, valve releasing means releasable by said plunger, a valve releasable by said valve releasing means, fluid means controlled by said valve, speed changing means adapted to be actuated by said fluid means, driving means, driven means, said speed changing means adapted to change the speed ratio of said driving means and said driven means, other fluid means controlled by said first mentioned fluid means, and other speed changing means controlled by said other fluid means.

4. In a speed changing mechanism, speed changing means, fluid means adapted to actuate said speed changing means, said fluid means including in combination valvular means, locking and releasing means for said valvular means, actuating means for said locking and releasing means, and gradient means adapted to move into and out of the path of movement of said actuating means to control said actuating means.

5. In a speed changing mechanism, speed changing means, actuating means for said speed changing means, said actuating means including in combination reciprocating means, means adapted to actuate said reciprocating means in one direction, means adapted to actuate said reciprocating means in another direction, and gradient control means adapted to block the movement of said reciprocating means.

6. In a speed changing mechanism, speed changing means, fluid means for actuating said speed changing means, said fluid means including in combination valvular means, resilient means adapted to actuate said valvular means in one direction, said fluid means also including in combination fluid motor means, adapted to actuate said valvular means in another direction, actuating means for said fluid motor means, holding and releasing means adapted to hold said valvular means in fixed position and to release said valvular means, said holding and releasing means preventing said resilient means functioning when holding said valvular means, and actuating means for said holding and releasing means.

7. In an automatic speed changing mechanism, driving means, driven means, speed changing means adapted to actuate changes in the speed ratio of said driving means and said driven means, fluid means, said fluid means adapted to actuate said speed changing means, and control means adapted to automatically control said fluid means, said fluid means including in combination a suction means, a fluid chamber having a piston, a plurality of conduits having connections to said fluid chamber at the same side of said piston, said plurality of conduits also having connections to the suction means, a valve, said valve adapted to simultaneously open one of said conduits and to block another of said conduits.

8. In a speed changing mechanism, speed changing means, said speed changing means including in combination fluid means, said fluid means including in combination valvular means, spring pressed locking and releasing means adapted to securely lock and release said valvular means, actuating means adapted to automatically actuate said spring pressed locking and releasing means, and centrifugal means adapted to contact and actuate said actuating means.

9. In an automatic speed changing mechanism, speed changing means, shiftable means adapted to actuate said speed changing means, fluid means adapted to actuate said shiftable means, valvular means adapted to control said fluid means, spring pressed locking and releasing means adapted to securely lock and release said valvular means, and centrifugally actuated means adapted to automatically actuate said spring pressed locking and releasing means.

10. In a speed changing mechanism, speed changing means including in combination a speed control, controlling means adapted to control said speed control, a plurality of fluid chamber means, suction means, connection means connecting said plurality of fluid chamber means and said suction means, said connection means including in combination a general connection means and a plurality of connection means connected to said general connection means, and valvular means adapted to be manually actuated to closed position to block or close said general connection means between said suction means and said plurality of connection means, and means adapted to actuate said controlling means and said valvular means.

11. In a speed changing mechanism, a plurality of speed changing means, speed controlled means adapted to actuate said plurality of speed changing means, preventive means adapted to prevent said speed controlled means actuating a plurality of said speed changing means simultaneously, said preventive means including in combination movable means movable into the path of said speed controlled means, said movable means adapted to be actuated by said speed controlled means, dogging means adapted to securely hold said movable means, and releasing means adapted to release said dogging means.

12. In a speed changing mechanism, driving means, driven means, in combination speed changing means adapted to change the speed ratio of said driving means and said driven means, said speed changing means including in combination a plurality of gears, a plurality of reciprocating means adapted to functionally connect said gears with said driven means and to functionally disconnect said gears from said driven means, a plurality of lever means for actuating said reciprocating means, a plurality of pneumatic chambers for actuating said lever means, suction means, connection means connecting said suction means with said plurality of pneumatic chambers, said connection means including in combination conduit means and a plurality of valvular means, spring pressed locking means for securely locking one of said valvular means, releasing means for said spring pressed locking means, centrifugal means for actuating said releasing means, and means connecting said centrifugal means with said driven means.

13. In a speed changing mechanism, driving means, driven means, a plurality of gears adapted to cooperate with said driven means and said driving means, reciprocating means adapted to cooperate with said plurality of gears, actuating means including in combination lever means for actuating said reciprocating means, pneumatic means for actuating said lever means, valvular means for controlling said pneumatic means, spring pressed locking means for said valvular means, releasing means for said spring pressed locking means, and speed controlled means for actuating said releasing means.

14. In a speed changing mechanism, a plurality of shafts, a plurality of means for functionally connecting and functionally disconnecting said shafts, a plurality of reciprocating means for actuating said plurality of means, a plurality of lever means for actuating said plurality of reciprocating means, pneumatic means for controlling said lever means, valvular means for actuating said pneumatic means, spring pressed locking means for securely locking said valvular means, releasing means for said spring pressed locking means, and speed controlled means for actuating said releasing means.

15. In a speed changing mechanism, a plurality of shafts, a plurality of means for functionally connecting and functionally disconnecting said shafts, a plurality of reciprocating means for actuating said plurality of means, a plurality of lever means for actuating said plurality of reciprocating means, fluid means for actuating said lever means, valvular means for actuating said fluid means, resilient locking means for securely locking said valvular means, releasing means for said resilient locking means, and means for automatically actuating said releasing means.

16. In a speed changing mechanism, driving means, driven means, gearing means, clutching means for functionally connecting said gearing means with said driving means and said driven means, reciprocating means for actuating said clutching means, actuating means for said reciprocating means, said actuating means including in combination lever means, fluid motor means for actuating said lever means, fluid means for actuating said fluid motor means, valvular means for controlling said fluid means, resilient means for actuating said valvular means in one direction, and fluid motor means for actuating said valvular means in another direction, actuating means for said last mentioned fluid motor means, locking means for said valvular means, releasing means for said locking means, and centrifugal means adapted to brush by and actuate said releasing means.

17. In a transmission, a plurality of rotatable shafts, connection means for functionally connecting said plurality of rotatable shafts, a plurality of conduits, suction means, a fluid motor having a piston and a plurality of ports, said fluid motor adapted to actuate said connection means, one of said plurality of conduits being connected to one of said ports and to said suction means, a valve cooperating with said last mentioned conduit, said valve adapted to permit said suction means to draw fluid from said conduit cooperating with said valve, and said conduit to draw fluid from said port to which it is connected, thereby actuating said piston of said fluid motor, a second valve cooperating with another conduit of said plurality of conduits, said second valve adapted to permit said suction means to draw fluid from said conduit cooperating with said second valve, and to draw fluid from one of said ports to which it is connected, thereby actuating said piston of said fluid motor similarly to its actuation by said first mentioned valve and its cooperating conduit, said first mentioned valve when actuated preventing the passage of fluid through said conduit cooperating with said second valve, and said second valve when actuated preventing the passage of fluid through said conduit cooperating with said first mentioned valve, one of said valves adapted to control another of said first mentioned plurality of conduits, and speed controlled means for actuating said valves.

18. A speed changing mechanism including in combination speed changing means, fluid means for actuating said speed changing means, a valve for controlling said fluid means, a positive pawl for locking said valve, and speed controlled means for actuating said pawl.

19. A speed changing mechanism including in combination speed changing means, fluid means for actuating said speed changing means, a valve for controlling said fluid means, fluid means for retracting said valve, means for locking said valve in retracted position, and speed controlled means for actuating said locking means.

20. A speed changing mechanism including in combination automatic speed controlled means, and blocking means movable into the path of movement of said speed controlled means for blocking said speed control means, said blocking means being actuated into blocking position by said speed controlled means.

21. A speed changing mechanism including in combination speed changing means, fluid means for actuating said speed changing means, valvular means for controlling said fluid means, pivotal means for locking said valvular means in one position, actuating means for said locking means, said actuating means including in combination reciprocating means, resilient means for actuating said reciprocating means in one direction, and speed controlled means for actuating said reciprocating means in another direction, said pivotal means when actuated by said actuating means locking said reciprocating means.

22. In a transmission, a plurality of rotatable shafts, connection means for functionally connecting said plurality of rotatable shafts, suction means, a plurality of conduits, each of said plurality of conduits having means communicating with the atmosphere, a fluid motor, said fluid motor adapted to actuate said connection means, a plurality of said plurality of conduits connected to said suction means and to said fluid motor in a manner which assures a similar actuation of said fluid motor when each of said plurality of conduits connected to said fluid motor functions, a valve cooperating with one of said last mentioned plurality of conduits, said valve adapted to permit said suction means to draw fluid from said conduit cooperating with said valve, and said last mentioned conduit to draw fluid from said fluid motor, thereby actuating said fluid motor, a second valve cooperating with one of said plurality of conduits connected to said fluid motor, said second valve adapted to permit said suction means to draw fluid from said conduit cooperating with said second valve, and said last mentioned conduit to draw fluid from said fluid motor, said first mentioned valve when actuated preventing the passage of fluid through the means communicating with the atmosphere for said conduit cooperating with said second valve, said second valve when actuated preventing the passage of fluid through the means communicating with the atmosphere for said conduit cooperating with said first mentioned valve, each of said valves adapted to control a conduit of said first mentioned plurality of conduits other than said conduits cooperating with said valves and said means communicating with the atmosphere, locking means for each of said valves, releasing means for each of said locking means, and speed controlled means adapted to move into and out of contact with each of said releasing means, said speed controlled means adapted to actuate each of said releasing means.

CLIVE W. LANPHERE.